US005635825A

United States Patent [19]
Lesea

[11] Patent Number: 5,635,825
[45] Date of Patent: Jun. 3, 1997

[54] POWER FACTOR CORRECTED FEEDFORWARD COUPLED DC POWER SUPPLY

[75] Inventor: Ronald A. Lesea, Redwood Drive, Calif.

[73] Assignee: Electronic Lighting, Inc., Menlo Park, Calif.

[21] Appl. No.: 298,976

[22] Filed: Sep. 2, 1994

Related U.S. Application Data

[63] Continuation of Ser. No. 53,147, Apr. 27, 1993, Pat. No. 5,345,164.

[51] Int. Cl.$^6$ .................................................... G05F 5/00
[52] U.S. Cl. ........................................... 323/299; 363/84
[58] Field of Search ............................. 323/299; 363/84, 363/89, 125, 126

[56] References Cited

U.S. PATENT DOCUMENTS

| 3,754,182 | 8/1973 | Morris et al. | 323/299 |
| 3,913,002 | 10/1975 | Steigerwald et al. | 323/205 |
| 4,222,096 | 9/1980 | Capewell | 363/44 |
| 4,369,490 | 1/1983 | Blum | 363/48 |
| 4,719,552 | 1/1988 | Albach et al. | 363/89 |
| 4,808,887 | 2/1989 | Fahnrich et al. | 363/48 |
| 5,028,846 | 7/1991 | Lesea | 315/219 |
| 5,047,691 | 9/1991 | Lesea et al. | 315/244 |
| 5,146,398 | 9/1992 | Vila-Masot et al. | 363/89 |
| 5,289,361 | 2/1994 | Vinciarelli | 323/299 |
| 5,301,095 | 4/1994 | Teramoto et al. | 363/89 |
| 5,345,164 | 9/1994 | Lesea | 323/208 |

Primary Examiner—Jeffrey L. Sterrett
Attorney, Agent, or Firm—Burns, Doane, Swecker & Mathis, L.L.P.

[57] ABSTRACT

An improved power factor DC power supply in accordance with the present invention (100 or 200) employs a power factor correcting network (120), a full-wave rectifier means (122), a pair of filter capacitors (124 and 126), and three current steering diodes (128, 130 and 132). The power factor correcting network (120) includes both an inductor means (136 and 240) and a capacitor (138), the combination configured to improve the power factor DC power supply (100 or 200) presents to the AC power-line (102) by reducing the level of harmonic currents the DC power supply generates on the AC power-line. The filter capacitors (124 and 126) are configured with the current steering diodes (128, 130 and 132) such that the filter capacitors are charged in series and discharged in parallel. In addition, the filter capacitors (124 and 126) and the current steering diodes (128, 130 and 132) are configured such that during the periods when the level of the voltage being developed across the load (104) exceeds one-half the peak level, the improved power factor DC power supply (100 or 200) functions as though the filter capacitors were not in the circuit.

4 Claims, 4 Drawing Sheets

POWER FACTOR CORRECTED FEEDFORWARD COUPLED DC POWER SUPPLY

This application is being filed under 37 C.F.R. §1.53 as a continuation of application Ser. No. 08/053,147, filed Apr. 27, 1993 now U.S. Pat. No. 5,345,164.

BACKGROUND OF THE INVENTION

1. Field of the Invention

The present invention relates to the power factor which loads present to AC power-lines generally and more specifically to the reduction of the harmonic currents generated on an AC power-line by a DC power supply.

2. Description of the Related Art

The power factor, PF, that a load presents to an AC power-line has long been of concern. Typically, DC power supplies employ a bridge rectifier, a filter capacitor, and sometimes a filter choke. The input of the rectifier is coupled (by a fuse, switch, etc.) across an AC power-line. The output of the rectifier is either coupled by a series choke across the capacitor (choke input filter) or, absent the choke, directly connected across the capacitor (capacitor-input filter) to develop a DC output potential across the capacitor.

With the choke (input filter), DC power supplies draw from the AC power-line a current the waveform of which approximates a square wave (when the inductance of the choke is much greater than what is commonly referred to as the "critical" inductance). Absent the choke, the waveform more approximates a series of pulses each of which is synchronized with a corresponding peak of the AC power-line potential. In either case, the current drawn from the AC power-line includes harmonic components, one for each of the odd harmonics of the AC power-line frequency.

DC power supplies do not conform to all of the old power factor conventions. (For example, it makes little sense to define the power factor a DC power supply presents to an AC power-line as the cosine of the phase angle between the voltage developed across the input of the DC power supply and the current flowing into it.) However, DC power supplies do present many of the same problems. DC power supplies, like other loads having a relatively low power factor, draw from the AC power-line a current the rms level of which is disproportionately high in relation to the current that should be dragon for the power consumed. [In other words, they do conform to the definition which states that the power factor of a load (in this case, a DC power supply) is given by the ratio of the actual power consumed to the apparent power.] Capacitor-input filter type DC power supplies present to an AC power line a power factor, PF, of approximately 58% and generate on the line harmonic currents (the total harmonic distortion, THD) the level of which is approximately 160%.

A relatively high AC power-line rms current is of concern in that the AC power-generating facilities and AC power-transmission facilities (lines and transformers) must be sized to accommodate the current. Further, generation and transmission losses are primarily resistive losses which, therefore, increase as the square of the level of the rms AC power-line current. It is important to note that even relatively small loads (DC power supplies) may be of concern. Although a small personal computer, for example, may not draw the level of the current drawn by a large smoke stack scrubber, if the DC power supply of the computer has a relatively low power factor, the current drawn by the DC power supply may be of such a level as to limit what may also be plugged into a single AC power-line wall outlet.

Of further concern is the current harmonic distortion. The harmonic components can cause destructive heating of various parts of the AC power distribution system. The "triplen" harmonics (third, ninth, fifteenth, etc.) will also add in the neutral of a three phase system and could possibly overheat the neutral wire. Additionally, these harmonic components can cause distortion of the AC voltage. The amount of the voltage distortion depends on the (non-zero) source impedance of the AC line and on the other connected loads. This voltage distortion could possibly interfere with the proper operation of other connected loads.

In U.S. Pat. No. 4,222,096 of D. Capewell and U.S. Pat. No. 4,369,490 of F. Blum, a circuit is disclosed which includes a capacitor connected in parallel with the input of the bridge rectifier of a (capacitor-input-type) DC power supply and an inducator connected between the AC power-line and the input of the rectifier to couple the DC power supply to the AC power-line. The Blum patent indicates on column 5, lines 23–29, that without the above-mentioned circuit, the DC power supply was found to present a power factor of 65% to the AC power-line. Also, it was found that without the above-mentioned circuit, the level of the third harmonic current is 88%, the level of the fifth harmonic current was 65% and the level of the seventh harmonic current was 38% of the level of the fundamental current. In one example, with the above-mentioned circuit, the DC power supply was found to present a power factor of 94% to the AC power-line. Also, with the above-mentioned circuit, the level of the third harmonic current was 20%, the level of the fifth harmonic current was 6% and the level of the seventh harmonic current was 2% of the level of the fundamental current.

SUMMARY OF THE PRESENT INVENTION

It is therefore the primary object of the present invention to provide a DC power supply which generates on an AC power-line a relatively low level of harmonic currents.

Another object of the present invention is to provide a DC power supply which presents to an AC power-line a relatively high power factor.

Yet another object of the present invention is to provide a DC power supply which is relatively inexpensive.

Briefly, a preferred embodiment of the present invention employs a power factor correcting network, a full-wave rectifier, a pair of filter capacitors, and three current steering diodes. The power factor correcting network includes both an inductor and a capacitor with the combination configured to improve the power factor DC power supply presented to the AC power-line by reducing the level of harmonic currents the DC power supply generates on the AC power-line. The filter capacitors are configured with the current steering diodes such that the filter capacitors are charged in series and discharged in parallel. In addition, the filter capacitors and the current steering diodes are configured such that during the periods when the level of the voltage being developed across the load exceeds one-half the peak level, the improved power factor DC power supply functions as though the filter capacitors were not in the circuit.

These and other objects of the present invention will no doubt become apparent to those skilled in the art after having read the detailed description of the presently preferred embodiment of the present invention which is illustrated in the figures of the drawing.

BRIEF DESCRIPTION OF THE FIGURES IN THE DRAWING

DESCRIPTION OF THE PREFERRED EMBODIMENTS

Figure 1:
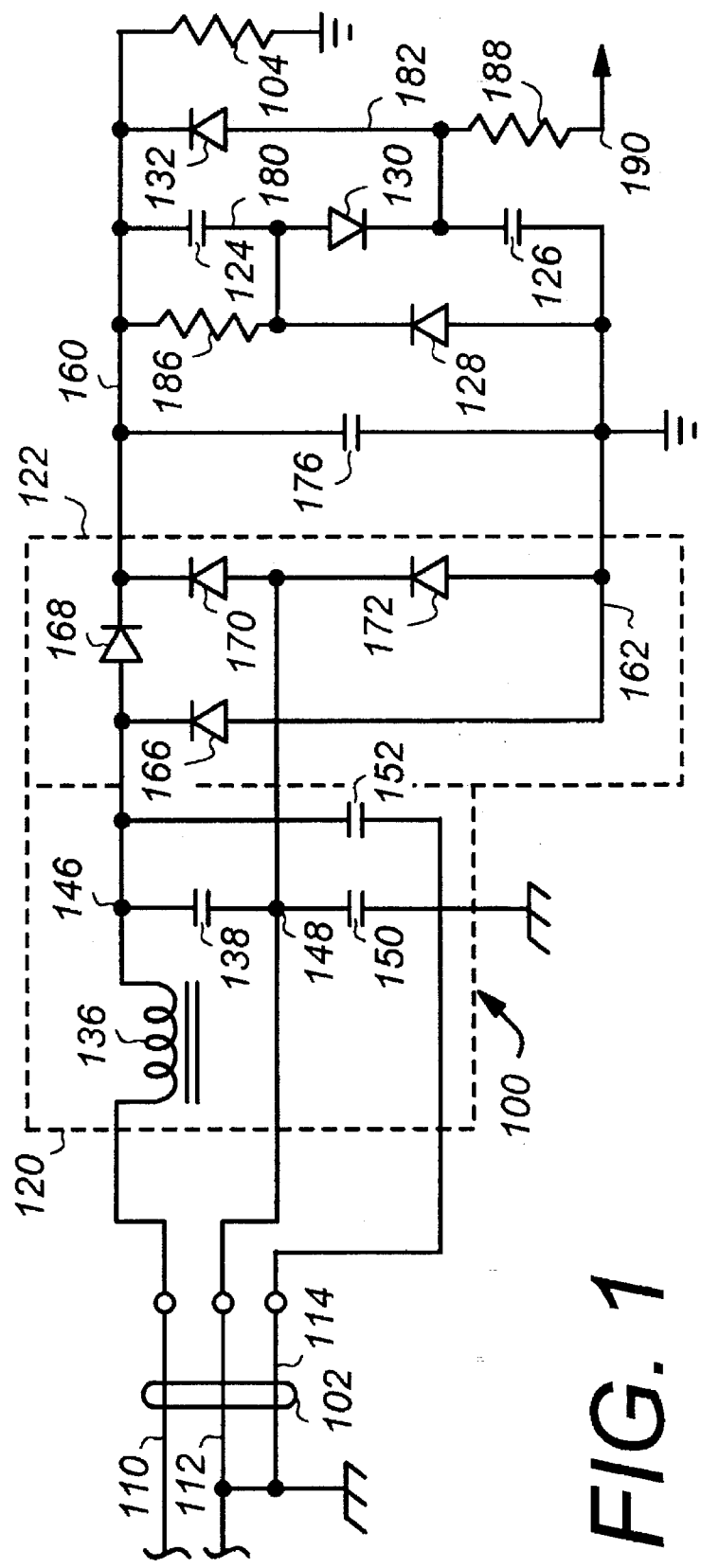
FIG. 1 is a schematic diagram of an embodiment of an improved power factor DC power supply in accordance with the present invention.

FIG. 1 is an embodiment of an improved power factor DC power supply in accordance with the present invention and referred to by the general reference character 100. DC power supply 100 provides for both connection to an AC power-line, represented by a single phase, AC power-line 102, and for connection to a (DC) load, represented by a resistor 104. When so connected, DC power supply 100 receives (AC) power from power-line 102 and delivers DC power to load 104. DC power supply 100 receives the (AC) power from AC power-line 102 so as to maximize the power factor the DC power supply presents to the AC power-line and to minimize the level of harmonic currents the DC power supply generates on said line, as will become apparent shortly.

The various conductor lines of AC power-line 102 include a hot line 110, a neutral line 112, and a ground line 114. DC power supply 100 employs, as principal components, a power factor correcting network 120; a full wave rectifier 122; a pair of filter capacitors 124 and 126; and three current steering diodes 128, 130 and 132.

Power factor correcting network 120 includes an inductor and a capacitor configured to improve the power factor DC power supply 100 presents to AC power-line 102 and to reduce the level of harmonic currents the DC power supply generates on the AC power-line. Specifically, for this purpose, the power factor correcting network 120 inductor is connected in series with the input of the full-wave rectifier across the AC power-line; and the power factor correcting network 120 capacitor is connected across the input of the full-wave rectifier. An inductor 136 is employed as the power factor correcting network 120 inductor, and a capacitor 138 for the power factor correcting network 120 capacitor. Inductor 136 is connected between AC power-line 102, line 110 and a node 146, which is connected to one of a pair of inputs of full-wave rectifier 122. The other one of the two inputs of full-wave rectifier 122 is connected to a node 148, which is directly connected to neutral line 112. Power factor correcting capacitor 138 is connected across the input of the full-wave rectifier 122 between nodes 146 and 148. Preferably, for 120 volt, sixty Hertz operation, inductor 136 has an inductance of 0.12 henrys and capacitor 138 has a capacitance of 2.2 microfarads, with a resonant frequency slightly higher than the fifth harmonic frequency of the AC power-line 102 frequency.

In addition to its function as part of power factor correcting network 120, capacitor 138 operates to reduce conducted noise. Also, for this purpose, DC power supply 100 additionally employs two capacitors 150 and 152. Capacitor 150 is connected between node 148 and the ground line 114 and capacitor 152 is connected between node 146 and ground line 114. Preferably, for 120 volt, sixty Hertz operation, capacitors 150 and 152 each have a capacitance of 3.3 nanofarads.

From the alternating current (charge flowing) in its input, the full-wave rectifier 122 is configured to develop a rectified current in a pair of lines 160 and 162. Line 162 is connected to circuit common (ground). Specifically, in the presently preferred embodiment, full-wave rectifier 122 is of the bridge type, which includes four rectifier diodes 166, 168, 170 and 172. Diode 166 is configured with its cathode connected to node 146 and its anode to line 162. Rectifier diode 168 is configured with its anode connected to node 146 and its cathode connected to line 160. The cathode of rectifier diode 170 is connected to line 160, and its anode is connected to node 148. Finally, rectifier diode 172 is configured with its cathode connected to node 148 and with its anode connected to line 152. Preferably, for 120 volt, sixty Hertz operation, rectifier diodes 166, 168, 170 and 172 are each of the type commonly designated 1N5061.

DC power supply 100 employs another noise reduction capacitor 176 connected between lines 160 and 162. Preferably, for 120 volt, sixty Hertz operation, capacitor 176 has a capacitance of one microfarad.

Filter capacitors 124 and 126 are connected with respect to current steering diodes 128, 130 and 132 such that the filter capacitors are charged in series and discharged in parallel. Specifically, capacitor 124 is connected between line 160 and a line 180; and capacitor 126 is connected between a line 182 and line 162. Steering diode 128 is configured with its cathode connected to line 180 and its anode connected to line 162. The anode of steering diode 130 is connected to line 180 and its cathode is connected to line 182. Finally, steering diode 132 is configured with its cathode connected to line 160 and its anode connected to line 182. Preferably, for 120 volt, sixty Hertz operation, capacitors 124 and 126 each have a capacitance of 100 microfarads and current steering diodes 128, 130 and 132 are each of the type commonly designated 1N4005.

DC power supply 100 employs a pair of bleeder resistors respectively designated 186 and 188. Resistor 186 is connected in parallel with capacitor 124 between lines 160 and 180. In one embodiment, resistor 188 is connected in parallel with capacitor 126 between lines 182 and 162. In another embodiment, resistor 188 is connected between line 182 and a line 190, which is connected to a load (a relatively low voltage circuit) that draws a relatively small amount of current, as will become apparent shortly. Preferably, for 120 volt, sixty Hertz operation, resistor 186 has a resistance of forty-seven kilohms and resistor 188 has a resistance of thirty kilohms. Finally, the (DC) load, represented by resistor 104 is connected between line 160 and circuit common line 162.

It is important to note that inductor 136 is connected in series with the input of full-wave rectifier 122 across AC power-line 102. Since the combination forms a series circuit, inductor 136 can be connected in either hot line 110 or neutral line 112 or divided in two and connected in both. In other words, all three variations are electrically equivalent.

Figure 2A:
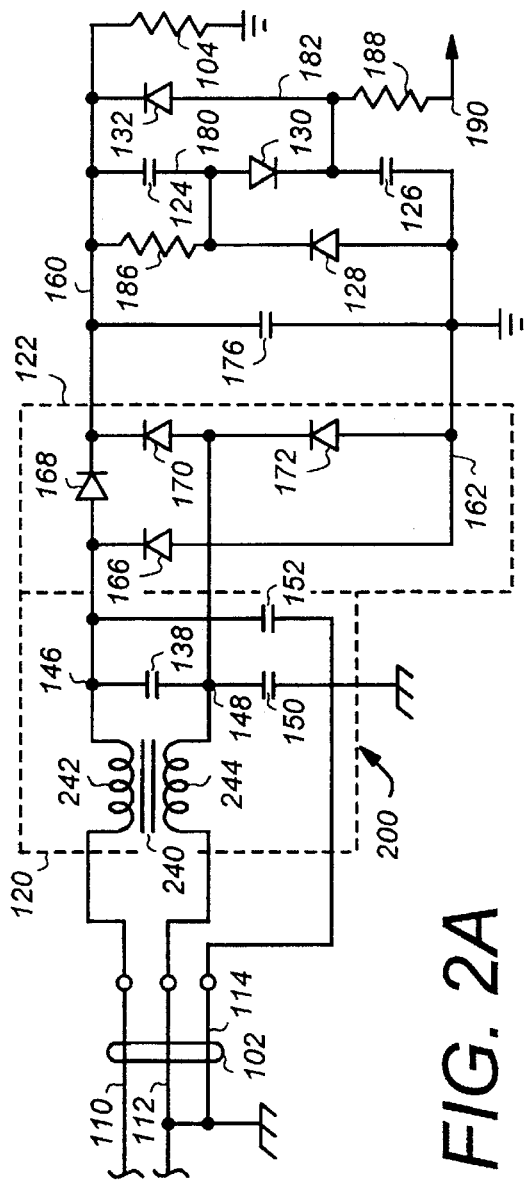
FIG. 2A is a schematic diagram of a further embodiment of an improved power factor DC power supply in accordance with the present invention.

Another embodiment of an improved power factor DC power supply is illustrated in FIG. 2A and designated by the general reference character 200. Those elements similar to FIG. 1 carry the same reference numeral. In embodiment 200, a transformer designated 240 is employed for the power factor correcting network 120 inductor. Transformer 240 has two windings, designated 242 and 244. Winding 242 is connected between hot line 110 and node 146; and winding 244 is connected between neutral line 112 and node 148. It is important that windings 242 and 244 be connected (phased) such that to the AC power-line 102 current, the mutual inductance presented by the transformer, is of the same sign as (adds to) the self-inductance presented by each of the windings. Again, power factor correcting capacitor 138 is connected across the input of the full-wave rectifier 122 between nodes 146 and 148. (Transformer 240 should not be confused with those commonly found in the art to step up or to step down the level of the AC voltage available across an AC power-line. Transformer 240 is not so configured and does not so operate.) For 120 volt, sixty Hertz operation, transformer 240 preferably provides a total series inductance of 0.12 henrys. Preferably, transformer 240 has a core that comprises a one-half inch thick stack (36 pieces) of silicon steel laminations. The laminations are preferably of the type which is commonly designated M6 and of the size which is commonly designated EI-37 and the two windings each consist of 220 turns of 25.5 AWG enameled copper wire.

It is important to note that the leakage reactance of each of the windings 242 and 244 of transformer 240 appear as series inductances at high frequencies, separate from the transformer itself. These leakage inductances provide both electromagnetic interference (EMI) and radio-frequency interference (RFI) filtering. In addition, these leakage inductances help attenuate high (such as 20th) order harmonics, which would, otherwise, be coupled to the AC power-line (102).

In understanding the operation of the improved power factor DC power supplies illustrated in FIGS. 1 and 2A, note that filter capacitors 124 and 126 are configured with current steering diodes 128, 130 and 132 such that the filter capacitors are charged in series and discharged in parallel. When filter capacitors 124 and 126 are charged, current (charge flow) is from the output of full-wave rectifier 122 in line 160, through filter capacitor 124, through current steering diode 130, through filter capacitor 128, in line 162, and back into the output of full-wave rectifier 122. Except when filter capacitors 124 and 126 are being charged, current steering diode 130 is reverse biased by the filter capacitors.

Further, note that current steering diodes 128 and 132 are reverse biased during the periods when the level of the voltage being developed between lines 160 and 162 (by AC power-line 102 and power factor correcting network 120) exceeds one-half the peak level. As a consequence, during these periods, current steering diodes 128 and 132 prevent the discharge of filter capacitors 124 and 126. In effect, during these periods, the improved power factor DC power supplies function as though filter capacitors 124 and 126 were not in the circuit. Thus, during these periods, the waveform of the voltage developed across the load (resistor 104) is substantially that of a rectified, unfiltered, sine wave. (Of course, as a consequence, the level of the peak-to-peak ripple in the DC voltage developed across load resistor 104 is approximately one-half the peak AC line voltage, eighty volts p-p for 120 volt operation.)

Finally, during the periods when the level of the voltage being developed between lines 160 and 162 is less than one-half the peak level, current steering diodes 128 and 132 couple capacitors 124 and 126 in parallel across the load resistor 104. As a consequence, the level of the voltage developed across the load resistor 104 does not drop substantially below a level of one-half the peak AC line voltage, eighty volts for 120 volt operation.

As previously indicated, during the periods that the level of the voltage being developed between lines 160 and 162 exceeds one-half the peak level, the power supplies 100 and 200 function as though filter capacitors 124 and 126 were not in the circuit. This is critical to the proper operation of the present invention. As a consequence, the power factor that DC power supplies 100 and 200 present to AC power-line 102 is substantially increased and the level of the harmonic currents they generate on the line is substantially decreased.

Consider the situation in which a resistor, such as a load resistor 104 is directly connected across an AC power-line such as line 102. In such a situation, the power factor, PF, that the load resistor presents to the AC power-line is unity and the level of the harmonic currents they generate on the line is zero. The total harmonic distortion, THD, is zero.

Next, consider the situation in which the load resistor is connected across the output of a bridge rectifier, the input of which is connected across the AC power-line. Absent any filter capacitors, a voltage is developed across the load, the waveform of which appears as a rectified sine wave. Such a circuit presents to the AC power-line a near unity power factor and generates on the line a near zero level of harmonic currents.

During the periods that the level of the voltage being developed between lines 160 and 162 exceeds one-half the peak level, improved power factor DC power supplies 100 and 200 function much as the above mentioned circuit in which the load resistor is connected across the output of a bridge rectifier, the input of which is connected across the AC power-line. Thus, during these periods, improved power factor DC power supplies 100 and 200 present to the AC power-line a near unity power factor and generate on the line a near zero level of harmonic currents. As a consequence, during the total time period, DC power supplies 100 and 200 generate substantially lower levels of harmonic currents on AC power-line 102, particularly at the third harmonic frequency. The reduced level of harmonic currents permits the inductor (136 or 240) and capacitor 138 to be resonant at a much higher frequency than would otherwise be practical, substantially reducing the size, weight and cost of these components.

It is important to note that filter capacitors 124 and 126 are connected with current steering diodes 128, 130 and 132 such that the filter capacitors are charged in series and discharged in parallel. As a consequence, capacitors 124 and 126 are subjected to a much lower voltage stress than would a single capacitor connected between lines 160 and 162. In addition, the capacitance of the series combination of capacitors 124 and 126 is one-fourth the capacitance of the parallel combination of capacitors 124 and 126. Thus, the charge flow to capacitors 124 and 126 is significantly reduced. As a consequence, the power factor that DC power supplies 100 and 200 present to AC power-line 102 is increased and the level of the harmonic currents they generate on the line is decreased. Further, because filter capacitors 124 and 126 are discharged in parallel, the level of the ripple component of the DC voltage DC power supplies 100 and 200 develop across load 104 is reduced, compared to the absence of these capacitors.

Figure 2B:
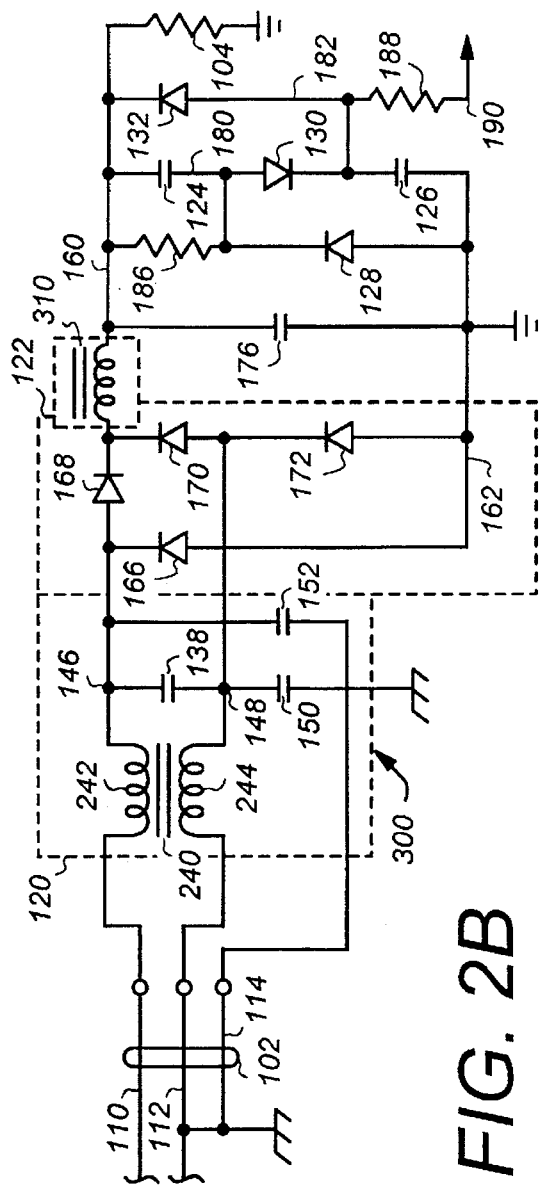
FIG. 2B is a schematic diagram of a variation of the embodiment of FIG. 2A.

FIG. 2B is a further embodiment of an improved power factor DC power supply and referred to by the general reference character 300. The power supply 300 is a modification of FIG. 2A and includes an additional small inductor 310 (approximately 10 mH in some embodiments) in series with diode 168 and between diode 170 and capacitor 176. Inductor 310 will, for some types of loads, further increase the power factor and lower the total harmonic distortion, while minimizing the size of the input inductor.

Figure 3:
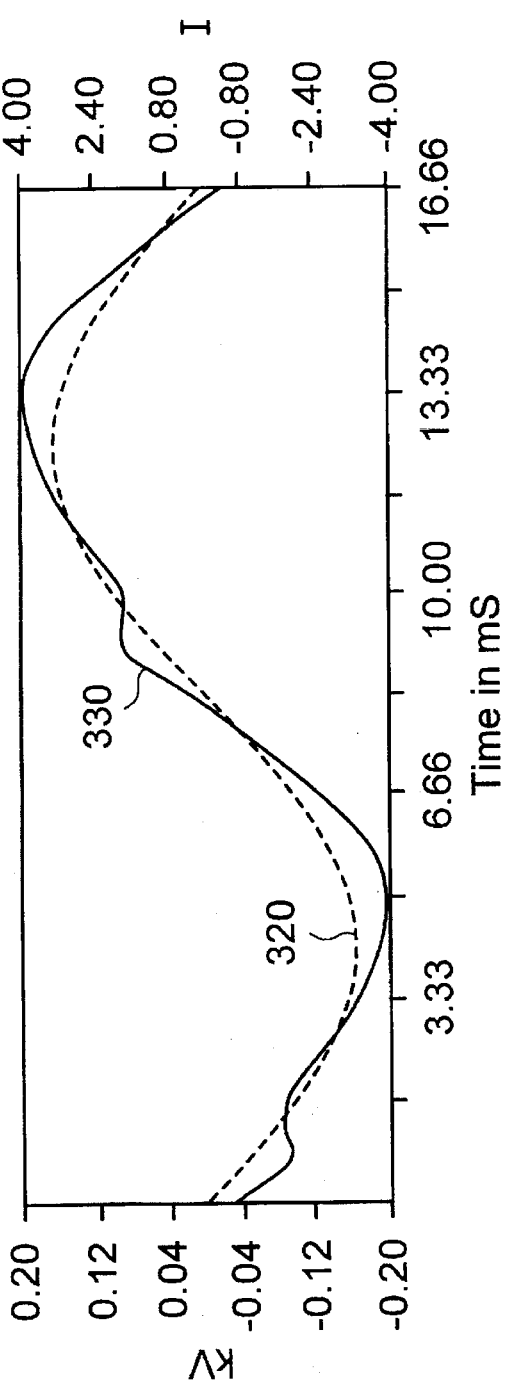
FIGS. 3 and 4 are waveforms associated with the DC power supplies illustrated in FIGS. 1 and 2A.
Figure 4:
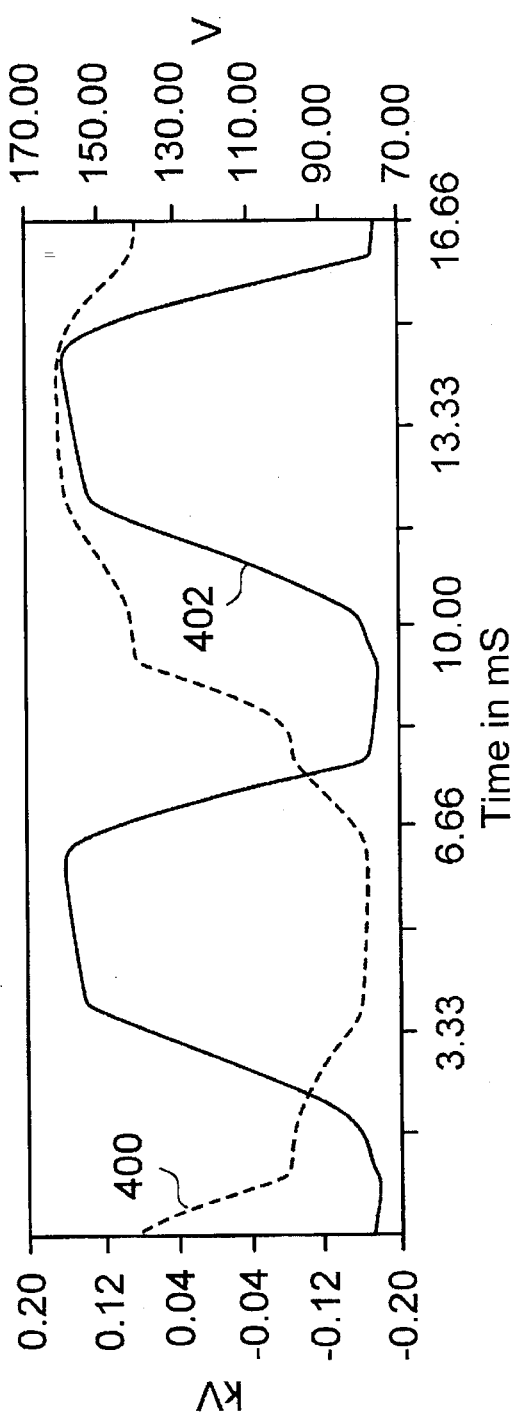

FIGS. 3 and 4 are diagrammatic waveforms associated with the power supplies illustrated in FIGS. 1 and 2A.

Specifically, in FIG. 3, is a waveform 320 of the voltage developed across AC power-line 102; and a waveform 330 of the current in AC power-line 102 when the power-line is connected to power supply 100 or 200. The voltage scale for waveform 320 is shogun on the left of the figure, and the current scale for the current waveform 330 is shown on the right of the figure.

FIG. 4 includes a waveform 400 of the voltage developed across capacitor 138 of power factor correcting network 120 and a waveform 402 of the voltage developed across load 104. The voltage scale for voltage waveform 400 is shown on the left of the figure and the voltage scale for the waveform 402 is shown on the right of the figure.

Figure 5:
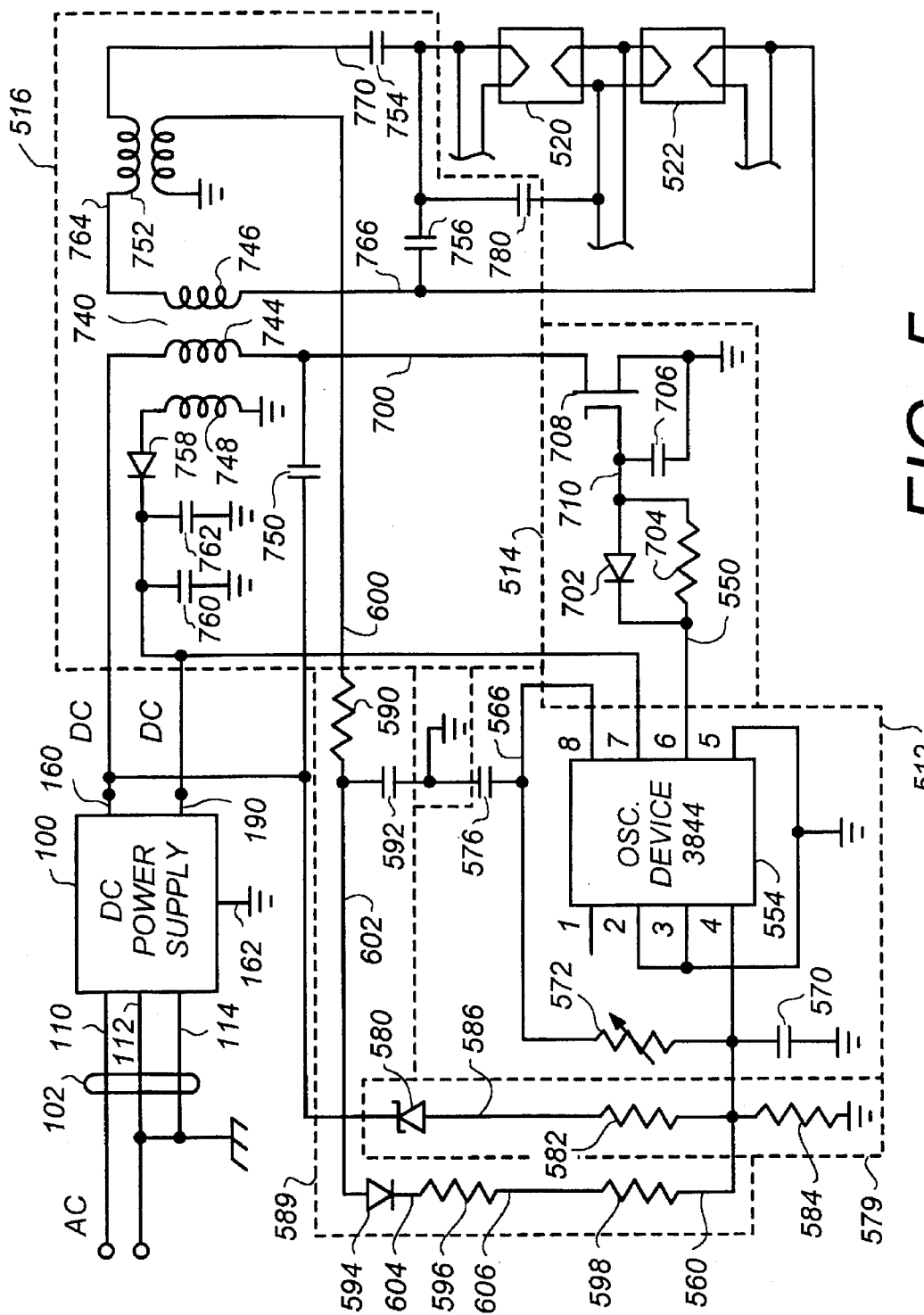
FIG. 5 is a combined block and schematic diagram of a single-ended ballast circuit employing the power supply illustrated in FIG. 2A.

Of course, the level of the ripple components of the DC voltage developed across load 104 is relatively high. As a consequence, DC power supplies 100 and 200 are not suitable for all applications. However, in many applications, the effect of the ripple can be reduced by means of feed-forward and/or feedback. Consider, for example, a ballast circuit 500 illustrated in FIG. 5. Ballast circuit 500 employs DC power supply 180 or 200; an oscillator 512, a switching circuit 514, and a current limiting (ballasting) network 516, all for driving a number of fluorescent lamps, which are represented by a pair of lamps 520 and 522.

As previously indicated, DC power supply 100 connects to AC power-line 102 to receive AC power from the line. From the AC power-line 102 power, DC power supply 100 develops a pair of DC voltages, including a primary, DC voltage on line 160 and a parasitic, DC voltage on line 190, both with respect to a circuit common potential developed on line 162.

Oscillator 512 is configured to generate on a line 550, a high frequency signal, preferably of a square-wave shape. Oscillator 512 is configured around an integrated circuit-type device 554, e.g. of the type that is commonly designated 3844. Specifically, device 554 is configured with device pin seven (VCC) connected to the parasitic DC voltage line 190 of DC power supply 100. Pin six (OUTPUT) is connected to line 550. In addition, device 554 is configured with pin two (Vfb), pin three (ISENSE) and pin five (GROUND) connected to circuit common. Device 554 is also configured with pin four (RT/CT) connected to a line 560, and pin eight (VREF) connected to a line 566. An oscillation frequency establishing capacitor 570 is connected between line 560 and circuit common. Represented by a variable resistor 572, preferably six resistors are connected in parallel between lines 566 and 560. (During production of ballast circuit 500, measurements are made of the power the circuit delivers to a load. Based upon the measurements, a predetermined number of the resistors are cut out of the circuit.) Finally, a bypass capacitor 576 is connected between lines 566 and circuit common. Preferably, capacitor 570 has a capacitance of 4.7 nanofarads; the six resistors represented by resistor 572 have a respective resistance of 560 kilohms, 280 kilohms, 140 kilohms, 69.8 kilohms, 34.8 kilohms and 4.02 kilohms; and capacitor 576 has a capacitance of 0.1 microfarads.

A feed-forward circuit 579 is employed for mitigating the effect of ripple on the DC voltage developed by DC power supply 100 on line 160, with respect to the circuit common potential. Specifically, the feed-forward circuit varies the power delivered to fluorescent lamps 520 and 522 by varying the oscillation frequency of frequency modulating oscillator 512 responsive to the instantaneous level of the DC voltage developed on line 160. As the instantaneous level of the DC voltage developed on line 160 rises, the feed-forward circuit 579 increases the level of the current in capacitor 570. For this purpose, the feed-forward circuit includes a zener diode 580 and a pair of resistors 582 and 584. For coupling the ripple component of the line 160, voltage to a line 586, diode 580 is configured with its cathode connected to line 160 and its anode connected to line 586. For converting the ripple voltage to a ripple current, resistors 582 and 584 are connected in a voltage divider configuration with resistor 582 connected between lines 586 and 560 and resistor 584 connected between line 560 and circuit common. Zener diode 580 is of the type which is commonly designated 1N5264 and resistors 582 and 584 have a respective resistance of one megohm and 26.1 kilohms. As above indicated, the feed-forward circuit varies the oscillation frequency of frequency modulating oscillator 512 responsive to the instantaneous level of the DC voltage developed on line 160. In another embodiment, the feed-forward circuit 579 varies the oscillation pulse width (duty cycle) of oscillator 512 responsive to the instantaneous level of the DC voltage developed on line 160.

A feedback circuit 589 is employed for maintaining a quasi-constant power level in fluorescent lamps 520 and 522. Specifically, the feedback circuit varies the power delivered to the lamps by varying the frequency of frequency modulating oscillator 512 responsive to the level of the current in current limiting (ballasting) network 516. For this purpose, the feedback circuit 589 includes a resistor 590, a capacitor 592, a diode 594, and a pair of resistors 596 and 598. To develop a sense current, resistor 590 and capacitor 592 are configured to receive and integrate a small sense voltage, which is developed on a line 600 (with respect to the circuit common potential) from the current in network 516. For this purpose, resistor 590 and capacitor 592 are connected in a low-pass integrator configuration with the resistor connected between line 600 and a line 602 and with the capacitor connected between line 602 and circuit common.

For converting the integrated voltage to a current for driving oscillator 512, diode 594 is configured as a current steering diode with its anode connected to line 602 and with its cathode connected to a line 604. Resistor 596 is connected between line 604 and a line 606 and resistor 598 is connected between lines 606 and 560. In the preferred embodiment, resistor 590 has a resistance of thirteen kilohms, capacitor 592 has a capacitance of 2.2 nanofarads, diode 594 is of the type which is commonly designated 1N4148, and resistors 596 and 598 have a respective resistance of eighteen kilohms and twenty kilohms. As previously indicated, in the preferred embodiment, the feedback circuit 589 varies the oscillation frequency of frequency modulation oscillator 512 responsive to the level of the current in current limiting ballasting network 516. In another embodiment, the feedback circuit 589 varies the oscillation pulse width (duty cycle) of oscillator 512 responsive to the level of the current in current limiting (ballasting) network 516.

In the embodiment 500, switching circuit 514 is configured to be responsive to the high frequency signal generated on line 550 by oscillator 512 and operative to periodically couple a line 700 to circuit common. For this purpose, switching circuit 514 includes a diode 702, a resistor 704, a capacitor 706, and a transistor 708. Resistor 704 and capacitor 706 are configured to slow down the rise time of the voltage developed at the gate of transistor 708, to slow down the rate at which the transistor must discharge parasitic capacitances at the transistor drain, and to reduce the required peak current requirements of the transistor.

Specifically, resistor 704 is connected between line 550 and a line 710 and capacitor 706 is connected between line 710 and circuit common. To maintain a fast fall time of the voltage developed at the gate of transistor 708, diode 702 is configured as a current steering diode with the diode cathode connected to line 550 and with the diode anode connected to line 710. Transistor 708 is configured with its gate connected to line 710, its drain connected to line 700, and its source connected to circuit common. Although a bipolar type transistor, an IGBT type device, or a SCR type device may be employed for transistor 708, in embodiment 500, a transistor of the MOS field effect (FET) type is employed, preferably of the type which is commonly designated 6N70. (A 6N70 transistor has a BVDSS of 700 volts and an RDS(on) of 1.4 ohms.) Preferably, diode 702 is of the type commonly designated 1N4148. In addition, preferably resistor 704 has a resistance of 270 ohms and capacitor 706 has a capacitance of one nanofarad.

In one embodiment, current limiting (ballasting) network 516 includes a transformer (inductive means), which is designated 740 with a primary winding 744 and a pair of secondary windings 746 and 748, a capacitor 750, another transformer (inductive means) 752, a capacitor 754, and a capacitor 756. As a transformer, transformer 740 is configured to provide isolation for fluorescent lamps 520 and 522. As an inductor, transformer 740 provides an impedance transformation. For these purposes, transformer 740 is configured with one end of primary winding 744 connected to DC power supply 100 by line 160 and the other end of primary winding 744 coupled to the drain of transistor 708 by line 700. Secondary winding 748 is configured to provide DC power for oscillator 512. For this purpose, secondary winding 748 is connected between circuit common and the anode of diode 758, the cathode of which is connected to DC power supply 100 through DC voltage line 190. A pair of filter capacitors 760 and 762 are connected in parallel between line 190 and circuit common. Secondary winding 746 is configured with one end of the winding connected to a line 764 and with the other end connected to a line 766. Capacitor 750 is connected to the drain of transistor 708 and to circuit common through the source of transistor 708. In embodiment 500, capacitor 750 is connected between line 700 and line 160 to reduce the DC voltage (stress) across the capacitor. Transformer 752 is configured as an inductor connected between lines 764 and a line 770. In this embodiment, capacitors 754 and 756 are connected in series between lines 770 and 766. Also, fluorescent lamps 520 and 522 are connected in series across capacitor 756. As a starting aid, a capacitor 780 is connected in parallel with fluorescent lamp 520. To develop the small feedback sense voltage, a small number (preferably seven) turns of wire are wound around transformer 752 to form a sense winding. (The small sense voltage is integrated by resistor 590 and capacitor 592 to develop across the capacitor a voltage proportional to the level of the current in inductor 752.) The sense winding is connected between circuit common and line 600. For further details of the above-described current limiting (ballasting) network 516, the reader is referred to U.S. Pat. No. 5,028,846. In other embodiments, other current limiting (ballasting) networks are employed, which are disclosed in the above mentioned patent and in U.S. Pat. No. 5,047,691 of Ronald A. Lesea and John B. Sampson.

It is contemplated that after having read the preceding disclosure, certain alterations and modifications of the present invention will no doubt become apparent to those skilled in the art. It is therefore intended that the following claims be interpreted to cover all such alterations and modifications as fall within the true spirit and scope of the invention.

I claim:

1. Apparatus for supplying power, the apparatus comprising:

a DC power supply having an output which includes a periodic ripple component;

a modulating circuit for modulating said output from said DC power supply and providing an output signal having a variable power content; and a circuit for feedforward coupling of said output from said DC power supply having a periodic ripple component to said modulating circuit such that said variable power content of said output signal is varied in response to said periodic ripple component to compress peaks of output load current.

2. Apparatus according to claim 1, wherein said circuit for feedforward coupling further includes:

at least one device having non-linear gain.

3. Apparatus according to claim 2, wherein said at least one device is a Zener diode.

4. Apparatus according to claim 3, wherein said modulating circuit further includes:

an oscillator having a variable frequency or variable pulse width output.

\* \* \* \* \*